US012605933B2

(12) United States Patent
Ishikawa

(10) Patent No.: US 12,605,933 B2
(45) Date of Patent: Apr. 21, 2026

(54) METHOD FOR MANUFACTURING SUBSTRATE BONDED BODY AND METHOD FOR MANUFACTURING LIQUID EJECTION SUBSTRATE

(71) Applicant: CANON KABUSHIKI KAISHA, Tokyo (JP)

(72) Inventor: Tetsushi Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 18/359,176

(22) Filed: Jul. 26, 2023

(65) Prior Publication Data

US 2024/0051298 A1 Feb. 15, 2024

(30) Foreign Application Priority Data

Aug. 15, 2022 (JP) ................................. 2022-129394

(51) Int. Cl.
*B41J 2/16* (2006.01)

(52) U.S. Cl.
CPC ........... *B41J 2/1623* (2013.01); *B41J 2/1642* (2013.01); *B41J 2/161* (2013.01)

(58) Field of Classification Search
CPC ........ B41J 2/1623; B41J 2/1642; B41J 2/161; B41J 2/1628; B41J 2/1632; B41J 2/1635; B41J 2/1646
See application file for complete search history.

(56) References Cited

U.S. PATENT DOCUMENTS

| | | | | |
|---|---|---|---|---|
| 6,620,285 | B2 | 9/2003 | Tomita et al. | |
| 9,455,229 | B2 | 9/2016 | Aida et al. | |
| 9,842,879 | B2 | 12/2017 | Matsugai | |
| 10,068,775 | B2 * | 9/2018 | Fujii | H01L 21/6835 |
| 10,355,042 | B2 | 7/2019 | Matsugai | |
| 10,442,202 | B2 | 10/2019 | Fukumoto | |
| 10,854,667 | B2 | 12/2020 | Matsugai | |
| 11,305,539 | B2 | 4/2022 | Yonemoto | |

FOREIGN PATENT DOCUMENTS

| | | | |
|---|---|---|---|
| JP | 2002-190435 | A | 7/2002 |
| JP | 2006-114847 | A | 4/2006 |
| JP | 2013-91272 | A | 5/2013 |
| JP | 2016-1681 | A | 1/2016 |
| JP | 2017-54930 | A | 3/2017 |
| JP | 2018-202826 | A | 12/2018 |
| JP | 2021-20388 | A | 2/2021 |
| WO | 2013/161906 | A1 | 10/2013 |

* cited by examiner

*Primary Examiner* — Lisa Solomon
(74) *Attorney, Agent, or Firm* — Venable LLP

(57) ABSTRACT

Provided is a method for manufacturing a substrate bonded body in which a first substrate and a second substrate are bonded together, the first substrate forming a first portion of an element, and the second substrate forming a second portion of the element, including: a film-forming step of forming an inorganic film on a bonding face of the first substrate, the bonding face facing the second substrate, such that the bonding face has a convex shape toward the second substrate; a contact step of bringing the first substrate and the second substrate closer and into contact with each other; and a bonding step of bonding the first substrate and the second substrate by an adhesive.

19 Claims, 17 Drawing Sheets

METHOD FOR MANUFACTURING SUBSTRATE BONDED BODY AND METHOD FOR MANUFACTURING LIQUID EJECTION SUBSTRATE

BACKGROUND OF THE INVENTION

Field of the Invention

The present invention relates to a method for manufacturing a substrate bonded body and a method for manufacturing a liquid ejection substrate.

Description of the Related Art

Recording apparatuses (liquid ejecting apparatuses) using the inkjet method are configured such that droplets of ink (recording liquid) ejected to fly from an ejection port of a liquid ejection head are caused to land on a recording medium, thereby performing recording. The configuration of this sort of liquid ejection head will be described below.

Liquid ejection heads are formed using the MEMS technology by bonding a substrate on which ejection ports are formed to a substrate on which piezoelectric elements, electrical wiring, liquid channels including foaming chambers and the like, and vibrating films are formed. The piezoelectric elements are constituted by electromechanical transducers in order to pressurize liquid in the foaming chambers that are in communication with the ejection ports, and the vibrating plates form part of the foaming chambers and are components that propagate the vibration of the piezoelectric elements to ink. The ejection ports are formed at the positions of the foaming chambers. The ejection ports are formed at the positions respectively corresponding to the plurality of piezoelectric elements.

Japanese Patent Application Publication No. 2013-91272 describes a manufacturing method for manufacturing a liquid ejection head constituted by piezoelectric elements, including bonding silicon substrates together. In such substrate-to-substrate bonding, air bubbles may be entrapped between the boundary faces of the substrates to be bonded, and the substrates may be bonded without discharging the air bubbles. This occurs because bubbles are entrapped when the substrates are brought into contact with each other at random positions during bonding, and furthermore, if there are contact points between the substrates in the discharge path of air bubbles, the contact points become an obstacle to the discharge of air bubbles to the outside. When voids (gaps) are generated in the bonding region due to air bubbles entrapped during the bonding of substrates for a liquid ejection head, ink leakage occurs, resulting in ink contamination of the piezoelectric elements and color mixing.

Meanwhile, according to Japanese Patent Application Publication No. 2002-190435, bonding is performed while placing a substrate on a mounting table with a convex spherical cross-sectional shape, so that the bonding face of the substrate has a convex shape in the bonding apparatus, and the contact point spreads outward from a single central point.

According to the technique of Japanese Patent Application Publication No. 2002-190435, a substrate is deformed to a certain convex shape determined by the shape of the mounting table. Since there are many types of substrates such as thick and rigid substrates and thin and less rigid substrates, using a mounting table of the same shape may result in insufficient convexity or excessive convexity, causing cracks in less rigid substrates.

SUMMARY OF THE INVENTION

The present invention provides methods for manufacturing a substrate bonded body and a liquid ejection substrate, in which generation of voids in a bonding region between substrates can be suppressed.

The present invention is a method for manufacturing a substrate bonded body in which a first substrate and a second substrate are bonded together, the first substrate forming a first portion of an element, and the second substrate forming a second portion of the element, including:

- a film-forming step of forming an inorganic film on a bonding face of the first substrate, the bonding face facing the second substrate, such that the bonding face has a convex shape toward the second substrate;
- a contact step of bringing the first substrate and the second substrate closer and into contact with each other; and
- a bonding step of bonding the first substrate and the second substrate by an adhesive.

Further features of the present invention will become apparent from the following description of exemplary embodiments with reference to the attached drawings.

DESCRIPTION OF THE EMBODIMENTS

Hereinafter, a liquid ejection head and a liquid ejecting apparatus according to an embodiment of the present invention will be described with reference to the drawings. The following description shows an example in which the invention is applied to an inkjet recording head and an inkjet recording apparatus that eject ink as an example of liquid, but the invention can also be applied to other apparatuses. For example, the invention can also be applied to apparatuses such as printers, copiers, facsimiles with communication systems, and word processors with printer sections, and industrial recording apparatuses combined in a complex manner with various processing apparatuses such as apparatuses that perform biochip production and electronic circuit printing. The basic configuration of the liquid spray head is not limited to that in the following example. The present invention is broadly applicable to liquid spray heads in general, and can be applied to those that spray liquids other than ink. The configuration according to the example is an example for illustrative purposes only, and various combinations and modifications are possible within the scope of the invention.

Description of Entire Head

Figure 11:
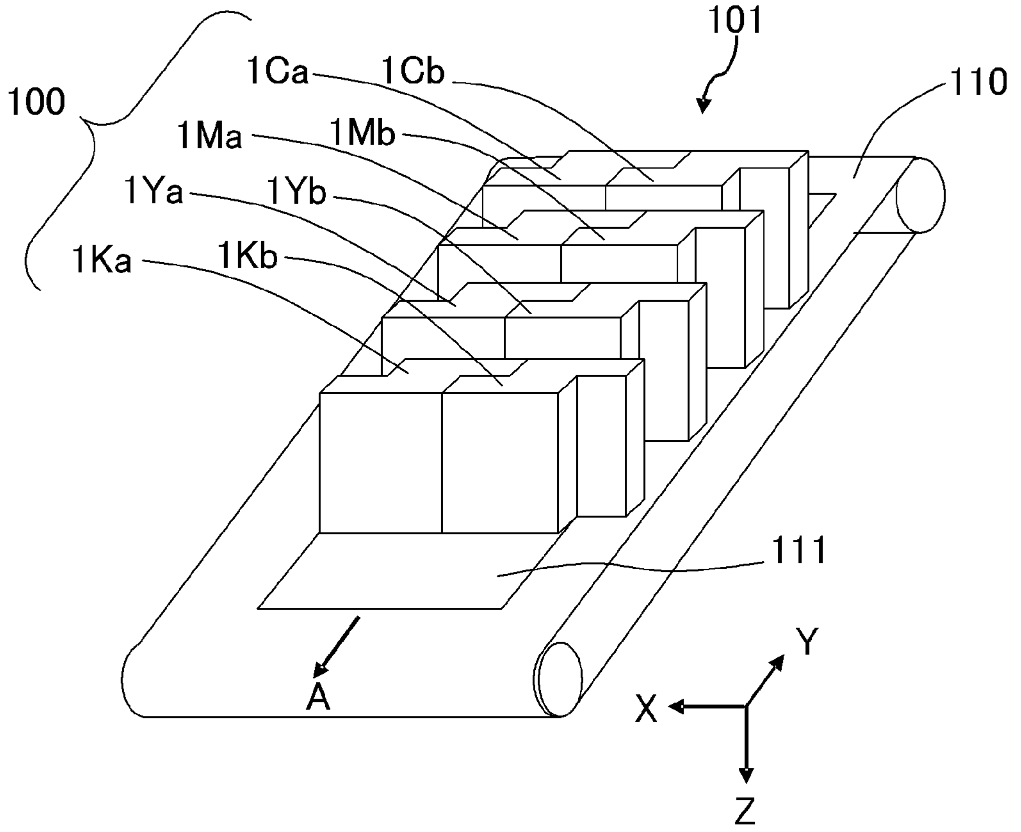
FIG. 11 is a schematic configuration view of an inkjet recording apparatus according to the example.

FIG. 11 is a schematic configuration view of an inkjet recording apparatus 101 according to the example. The inkjet recording apparatus 101 is a one-pass type recording apparatus that causes a liquid ejection head module 100 to record an image on a recording medium 111 in a single conveyance of the recording medium 111 by a convey section 110. Hereinafter, the width direction of the recording medium 111 is taken as an X direction, the conveyance direction (indicated by the arrow A) of the recording medium 111 is taken as a Y direction, and the direction that intersects the X direction and the Y direction is taken as a Z direction. The X direction and the Y direction are directions along an ejection face on which later-described nozzles of the liquid ejection head module 100 are formed, wherein the X direction (a first direction) is a direction in which nozzles are arranged, and the Y direction (a second direction) is a direction in which nozzle rows are arranged. The Y direction (the second direction) is a direction that is along the ejection face and intersects the X direction (the first direction). Typically, the X direction and the Y direction are orthogonal to each other along the horizontal plane, and the Z direction is parallel to the vertical direction.

The liquid ejection head module 100 is constituted by modules that respectively eject cyan, magenta, yellow, and black inks. The liquid ejection head modules of the respective colors are distinguished by the codes C, M, Y, and K. The liquid ejection head modules of the four colors are arranged along the conveyance direction of the recording medium 111 (the Y direction). The liquid ejection head modules of the respective colors each have sub modules that are arranged along the width direction of the recording medium 111 (the X direction). The sub modules are distinguished by the codes a and b. In FIG. 11, the liquid ejection head module 100 is disposed vertically above the recording medium 111 and ejects ink in a vertical downward direction (the Z direction). The configuration of the liquid ejection head module 100 shown in FIG. 11 is an example, and the present invention can be applied to other forms of liquid ejection head modules.

Description of Configuration of Liquid Ejection Head

Figure 12A:
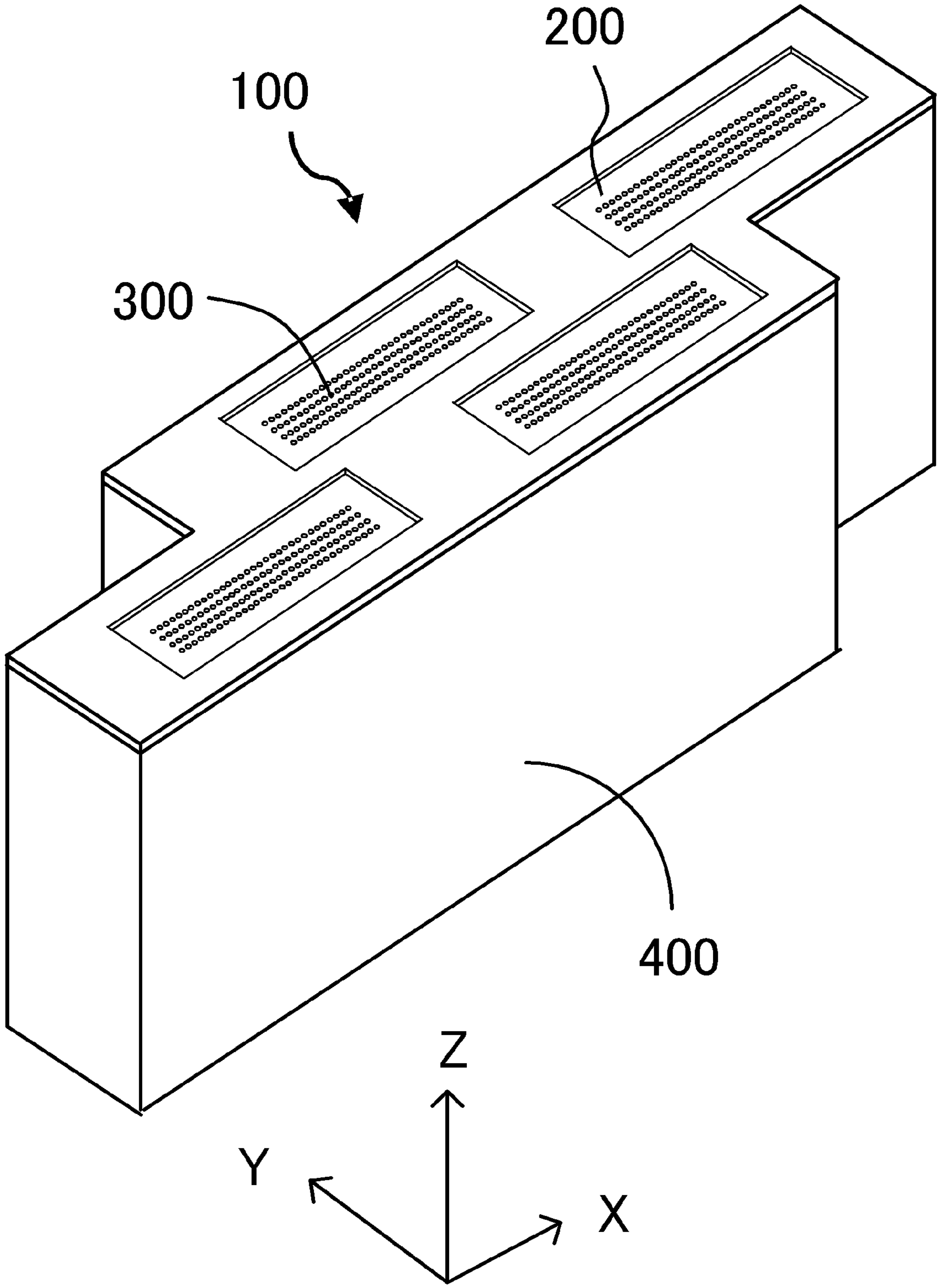
FIG. 12A is a schematic view of a liquid ejection head module according to the example.
Figure 12B:
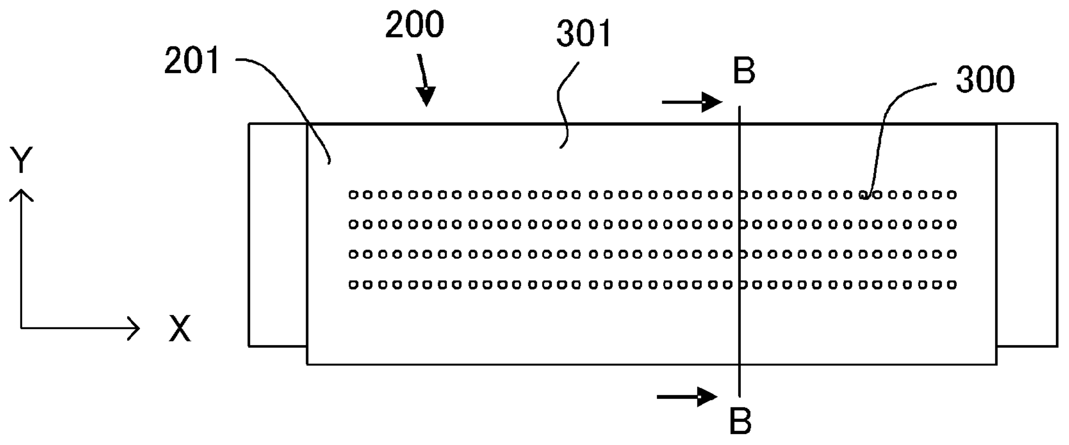
FIGS. 12B and 12C are schematic views of a liquid ejection head module according to the example.
Figure 12C:
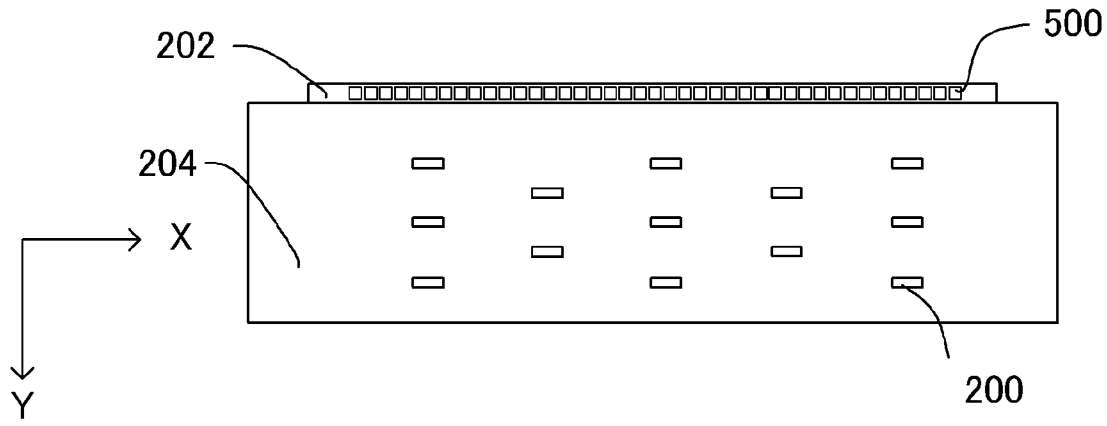

FIGS. 12A to 12C are schematic views of the liquid ejection head module 100. FIG. 12A is a perspective view of the liquid ejection head module 100 viewed from the ejection face side. FIG. 12B is a view showing an ejection face of a liquid ejection substrate 200. FIG. 12C is a view showing a face opposite to the ejection face of the liquid ejection substrate 200.

The liquid ejection head module 100 includes a head body 400 and a plurality of liquid ejection substrates 200 arranged on the head body 400. The liquid ejection head module 100 includes a plurality of nozzles 300 arranged in the X direction (the first direction) along an ejection face 301 of each liquid ejection substrate 200. The liquid ejection substrate 200 includes a nozzle substrate 201, and a plurality of nozzles 300 are arranged along the longitudinal direction of the nozzle substrate 201 (the X direction) to form nozzle rows. A plurality of nozzle rows is arranged on the nozzle substrate 201 along the short direction (the Y direction). The liquid ejection substrate 200 includes a channel forming substrate 204, and ink is supplied from an external ink tank to the liquid ejection substrate 200 via a supply external opening 220 formed through the channel forming substrate 204. The supplied ink flows through the channel inside of the liquid ejection substrate 200 and is ejected from the nozzles 300 to drop onto the recording medium 111. Ink is supplied from an ink tank (not shown) to a plurality of supply external openings 220 via a common supply port (not shown) provided in the head body 400.

The head body 400 includes an electric circuit substrate (not shown) for supplying electric power or signals for driving an actuator such as a piezoelectric element for ejecting ink from the nozzles 300. The electric circuit substrate is connected via a wire (not shown) to a terminal 500 of a vibrating substrate 202 on which an actuator of the liquid ejection substrate 200 is disposed. The configuration of the liquid ejection head module 100 shown in FIGS. 12A to 12C is an example, and the present invention can be applied to other forms of liquid ejection head modules.

Figure 9:
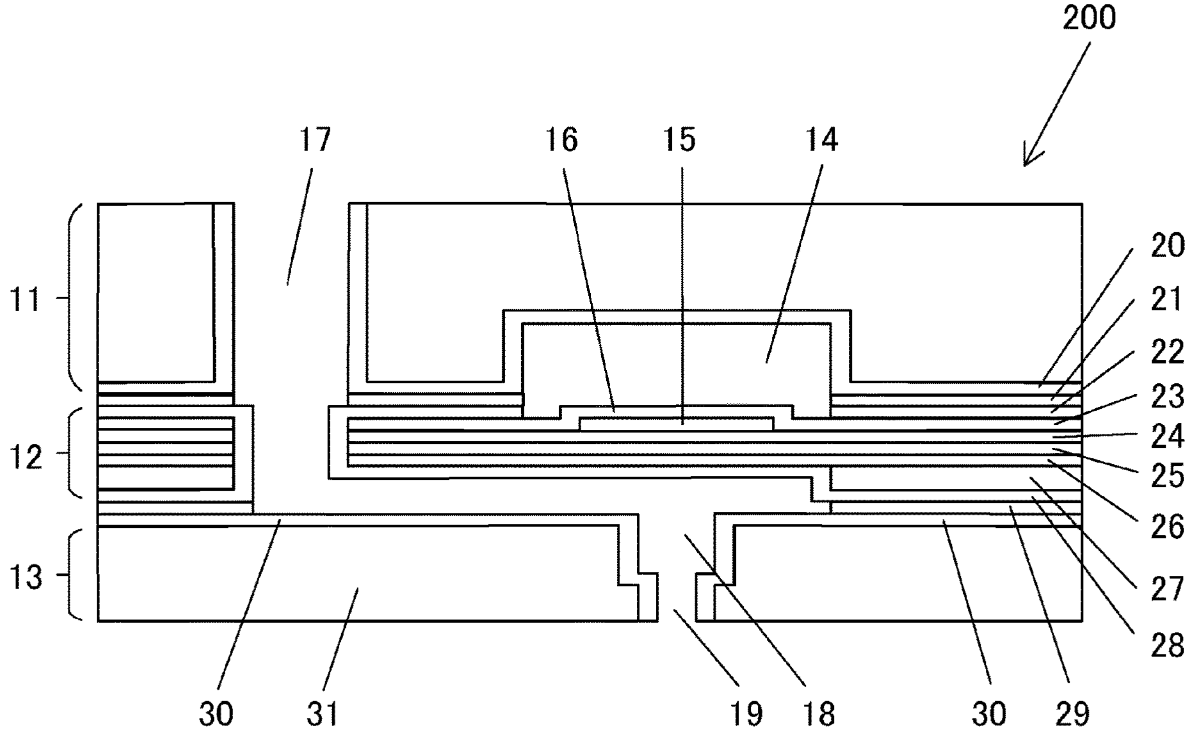
FIG. 9 is a cross-sectional view of a liquid ejection substrate according to the example.

FIG. 9 is a cross-sectional view of the liquid ejection substrate 200. FIG. 9 shows a cross-section taken along BB in FIG. 12B. In the liquid ejection substrate 200, a channel substrate 11 with a recess 14 is bonded via an adhesive layer 21 to an actuator substrate 12 including a piezoelectric element 15 and a vibrating film 16 that is in a layer adjacent to the piezoelectric element. A nozzle substrate 13 with an ejection port 19 is bonded via an adhesive layer 29 to the actuator substrate 12. A channel 17 and a foaming chamber 18 are formed in the structure in which the channel substrate 11, the actuator substrate 12, and the nozzle substrate 13 are bonded together. The foaming chamber 18 is a first channel that is in communication with the ejection port 19 and supplies the liquid, and the channel 17 is a second channel that is connected to the foaming chamber 18 to form a channel. The bonding region between the channel substrate 11 and the actuator substrate 12 has inorganic films 20 and 22 in which compressive stress is generated. The channel substrate 11 and the actuator substrate 12 whose bonding faces respectively have the inorganic films 20 and 22 are bonded together via the adhesive layer 21. The bonding region between the actuator substrate 12 and the nozzle substrate 13 has inorganic films 28 and 30 in which compressive stress is generated. The actuator substrate 12 and the nozzle substrate 13 whose bonding faces respectively have the inorganic films 28 and 30 are bonded together via the adhesive layer 29. The liquid ejection substrate 200 is a substrate bonded body in which a plurality of substrates is bonded together via adhesive layers in this manner. In the example in FIG. 9, an inorganic film is formed on the entire bonding region between the channel substrate 11 and the actuator substrate 12 and the entire bonding region between the actuator substrate 12 and the nozzle substrate 13, but the inorganic film may be formed only on part of the bonding regions. The adhesive layers 21 and 29 each have a thickness of 1 to 5 μm. In the example in FIG. 9, an inorganic film is not formed on bonding opposite faces, which are faces opposite to the bonding region between the channel substrate 11 and the nozzle substrate 13, but may be formed on the bonding opposite faces as well. In that case, a difference between a product of stress generated in the inorganic film formed on the bonding face and a film thickness and a product of stress generated in the inorganic film formed on the bonding opposite face and a film thickness is preferably negative. In the example in FIG. 9, the channel substrate 11, the actuator substrate 12, and the nozzle substrate 13 have a recess and through-holes that function as the channel 17, the foaming chamber 18, and the ejection port 19 in the substrate bonded body, and an inorganic film is formed on walls of the recess and the through-holes as well.

Figure 1:
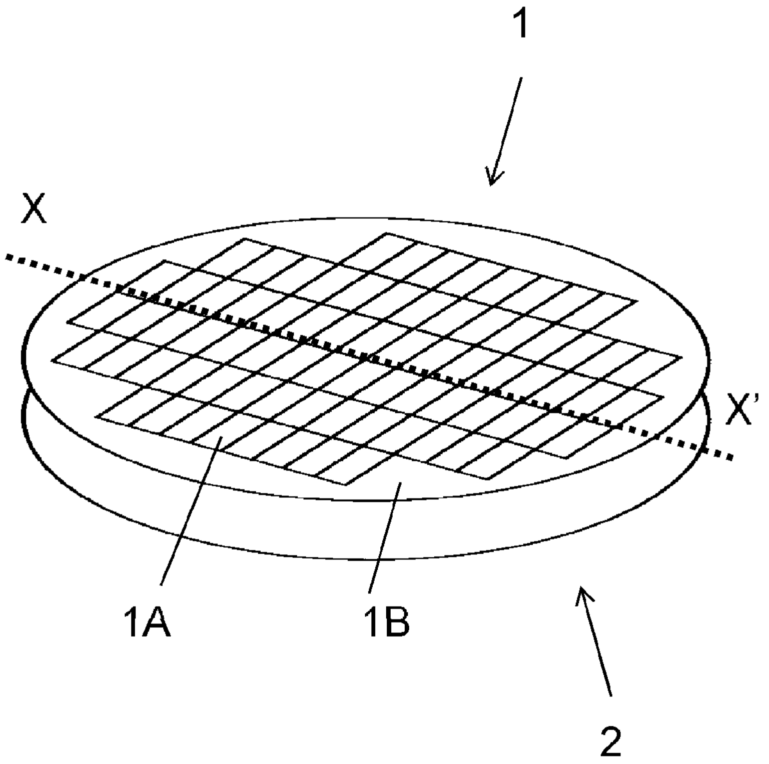
FIG. 1 is a perspective view showing wafer-like substrates during manufacture of a liquid ejection substrate.

FIG. 1 is a view showing two wafer-like silicon substrates that are bonded together to manufacture a liquid ejection substrate. A substrate 1 (a first substrate) includes a large number of element forming regions 1A in which elements (chips) are formed, and no elements are obtained from the other region 1B. In this example, at least two or more wafer-like substrates are bonded and divided through cutting to obtain a plurality of elements. FIG. 1 schematically shows a manner in which the substrate 1 (a first substrate) that forms a part (a first portion) of the liquid ejection substrate as an element and a substrate 2 (a second substrate) that forms another part (a second portion) of the liquid ejection substrate as an element are bonded together to obtain a substrate bonded body.

Figure 2A:
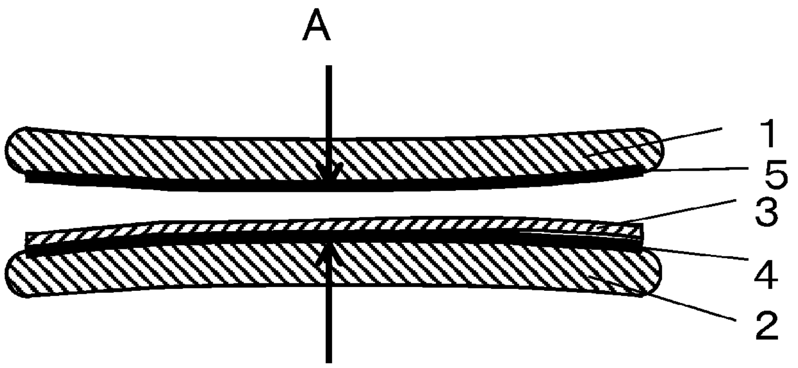
FIGS. 2A and 2B are cross-sectional schematic views of substrates during manufacture of a liquid ejection substrate according to an example.
Figure 2B:
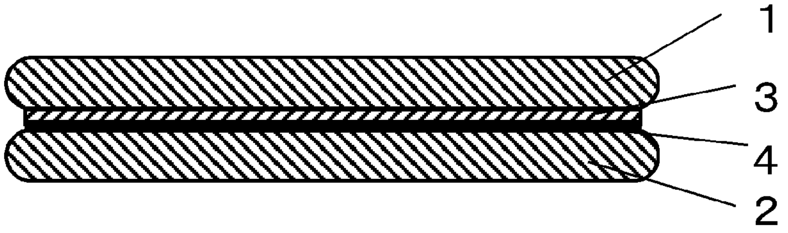
Figure 3A:
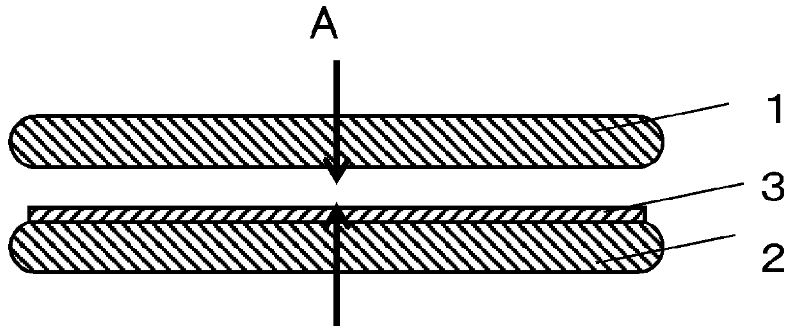
FIGS. 3A and 3B are cross-sectional schematic views of substrates during manufacture of a conventional liquid ejection substrate.
Figure 3B:
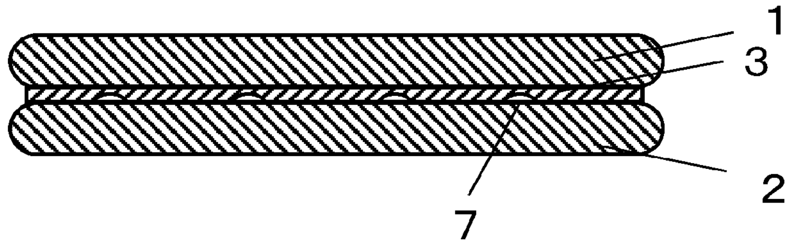

FIGS. 2A, 2B, 3A, and 3B show cross-sectional schematic views of a cross-section taken along X-X' in FIG. 1. FIGS. 2A and 2B show a manner in which substrates are bonded together according to the manufacturing method of the example, and FIGS. 3A and 3B show a manner in which substrates are bonded together according to a conventional manufacturing method.

According to a conventional manufacturing method, as shown in FIG. 3A, a flat substrate 1 and a flat substrate 2 are brought closer to each other in the arrow A direction, and bonded together via an adhesive 3. In this case, the substrates are brought into contact with each other at a plurality of random positions, and thus air bubbles entrapped between the substrates are not discharged, and voids 7 may be generated in the bonding region as shown in FIG. 3B.

According to the manufacturing method of the example, as shown in FIG. 2A, at least one bonding face of two substrates to be bonded has a convex shape toward the other bonding face. Accordingly, when the substrates 1 and 2 are brought closer to each other in the arrow A direction, the contact starts from the center of the substrates and the contact area spreads from the center to the outer circumference. This allows air between the substrates to be discharged to the outside, thereby suppressing entrapment of air bubbles between the substrates, and suppressing generation of voids in the bonding region as shown in FIG. 2B. In FIG. 2A, an inorganic film 5 is formed on the bonding face of the substrate 1 (the first substrate) such that the bonding face of the substrate 1 has a convex shape toward the bonding face of the substrate 2 (the second substrate), and an inorganic film 4 is formed on the bonding face of the substrate 2 such that the bonding face of the substrate 2 has a convex shape toward the bonding face of the substrate 1. However, for example, an inorganic film may be formed only on the bonding face of the substrate 1 or only on the bonding face of the substrate 2.

The convex faces of the substrates may be a bowl-shaped face (with a shape that is convex along a radial direction from the circumferential edge to the center) or a saddle-shaped face (with a shape that is convex along a direction that is perpendicular to a specific straight line extending through center, from the circumferential edge to the straight line). The convex shape depends on the pattern processed on the substrates. For example, if the processed shape is an unprocessed or isotropic layout, the face will be bowl-shaped, and, if the processed shape is an anisotropic layout (an elongated channel, etc.), the face will be saddle-shaped. The position of the apex of the convex shape (a point on a convex substrate that is closest to its facing substrate) is not limited to the center of the substrate. Even when the apex of the convex shape is not at the center of the substrate, the effects that the contact with the facing substrate starts from the apex of the convex shape and gradually spreads from the apex of the convex shape toward the outer circumference can be obtained in a similar manner.

The substrate is made convex by forming an inorganic film typically made of SiC, SiN, SiO, TiO, $Ta_2O_5$, $HfO_2$, $ZrO_2$, $Al_2O_3$, or the like under film-forming conditions that compressive stress acts on the bonding face of the substrate. Examples of the film-forming method include dry film-forming methods such as sputtering, CVD, and evaporation. For example, in a plasma CVD film-forming method, $SiH_4$ and $CH_4$ are used with a 13.56 MHz RF power supply HF (100 W) for the shower head and a 380 kHz RF power supply LF (200 W) for the platen, and the pressure is adjusted to 100 Pa for triode film-forming. As a result, an SiC film with a compressive stress of −500 MPa is formed. Although FIGS. 2A and 2B show an example in which the inorganic film 5 is formed on the substrate 1 and the inorganic film 4 is formed on the substrate 2 such that the substrates 1 and 2 are convex toward each other, there is no limitation to this. It is also possible that an inorganic film is formed on the bonding face of only one of the two substrates, and only the one substrate is convex toward its facing substrate.

Figure 4A:
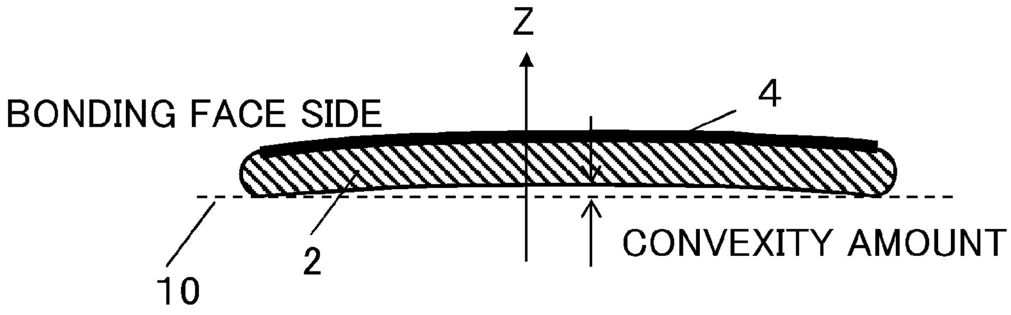
FIG. 4A is a view showing a substrate convexity amount according to the example.

FIG. 4A is a schematic view showing the convexity amount of the substrate 2 when the inorganic film 4 is formed thereon. The distance in the direction Z, which is perpendicular to the bonding face, between the apex of the convex shape of the convex substrate 2 and the bonding face of the substrate 2 when the substrate 2 is in a flat state is taken as a convexity amount. The convexity amount is preferably at least 0.1 mm. When the formed film is under compressive stress (compressive stress is negative), the face of the formed film is convex. The convexity amount is determined by the shape (substrate rigidity), the film stress (compressive stress), and the film thickness. The inorganic film 4 can be a single layer or a multilayer.

Figure 4B:
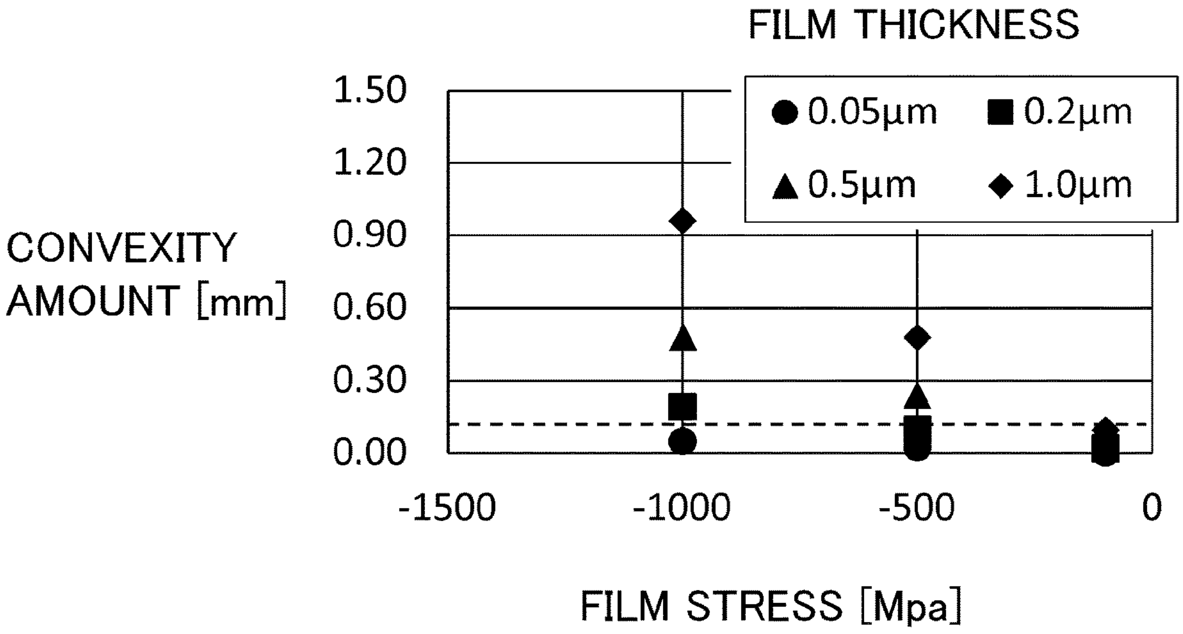
FIG. 4B is a graph showing a relationship between the film stress in an inorganic film, the film thickness, and the substrate convexity amount according to the example.

FIG. 4B shows a relationship between the film stress and the film thickness of the inorganic film 4 and the convexity amount of the substrate 2. The substrate thickness was set to 400 μm. The film stress is compressive stress and is negative. As shown in FIG. 4B, the larger the film stress (absolute value), the larger the convexity amount. The larger the film thickness, the larger the convexity amount.

Figure 4C:
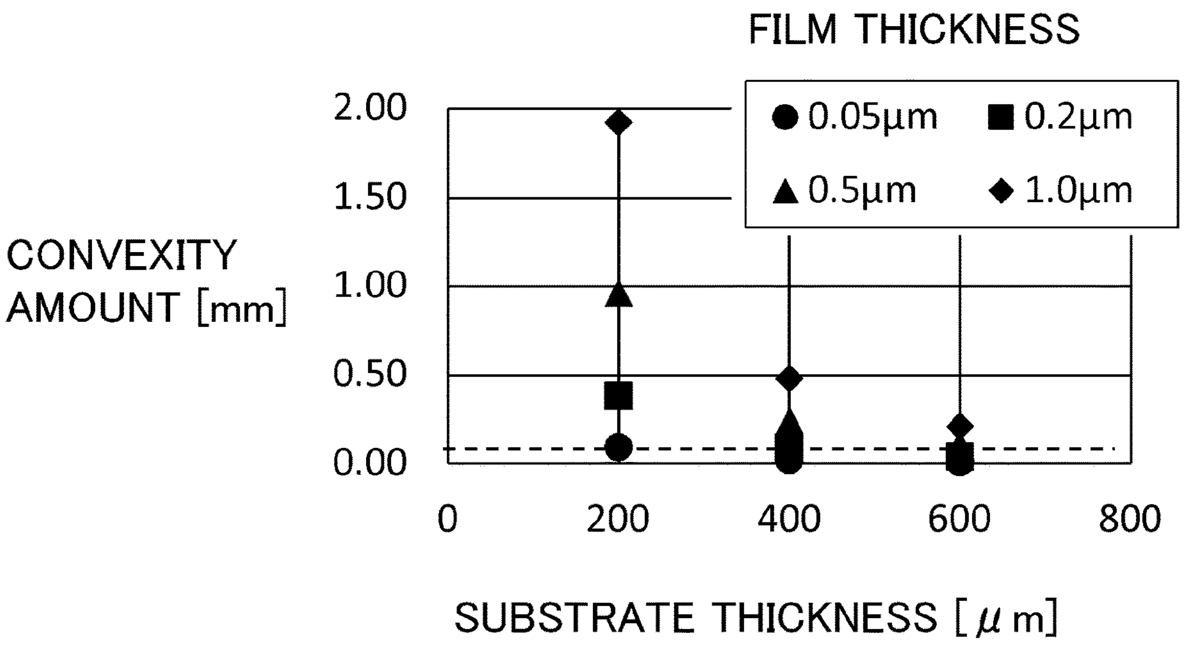
FIG. 4C is a graph showing a relationship between, the film thickness, the substrate thickness, and the substrate convexity amount according to the example.

FIG. 4C shows a relationship between the thickness of the substrate 2 and the convexity amount of the substrate 2. The film stress was set to −500 MPa. As shown in FIG. 4C, the smaller the substrate thickness, the larger the convexity amount. This is thought to be due to the decrease in rigidity of the substrate. The substrate thickness is preferably not more than 600 μm in order to suppress voids.

Figure 5A:
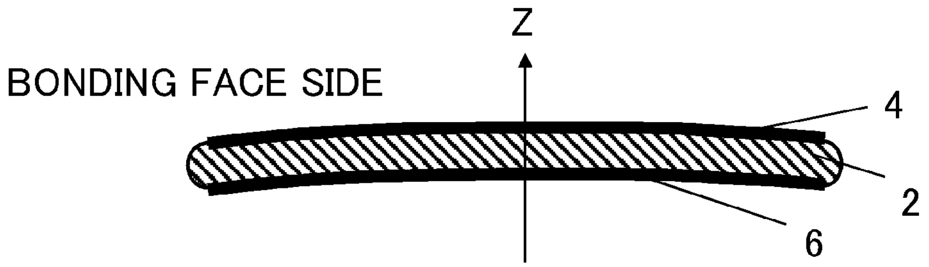
FIG. 5A is a view showing a state in which inorganic films are formed on both faces of the substrate according to the example.

FIG. 5A shows a state in which inorganic films 4 and 6 are formed on both faces of the substrate 2. As shown in FIG. 5A, if the inorganic film 6 formed on the face (which is referred to as a bonding opposite face) opposite to the bonding face of the substrate 2 is under tensile stress (tensile stress is positive), the convexity amount in the Z direction attributed to the inorganic film 4 increases due to the presence of the inorganic film 6. An inorganic film made of SiC, SiN, SiO, TiO, $Ta_2O_5$, $HfO_2$, $ZrO_2$, $Al_2O_3$, or the like may be formed under film-forming conditions that tensile stress acts on the bonding opposite face. For example, the stress that acts in a TiO film formed using the ALD film-forming method at a chamber temperature of 80° C. is 500 MPa (tensile stress). The stress increases as the chamber temperature is increased.

Figure 5B:
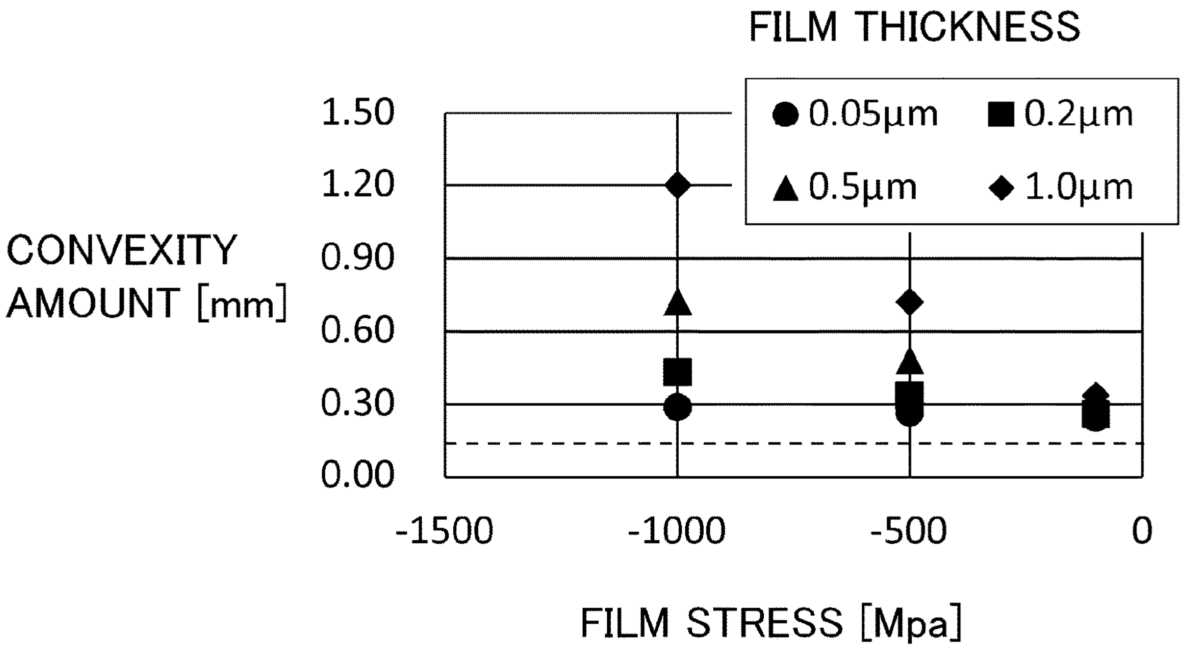
FIG. 5B is a graph showing a relationship between the film stress in an inorganic film, the film thickness, and the substrate convexity amount according to the example.

FIG. 5B shows a relationship between the film stress and the film thickness of the inorganic film 4 and the convexity amount of the substrate 2. The substrate thickness was set to 400 μm, and an inorganic film 6 with a tensile stress of +500 MPa and a film thickness of 0.5 μm was formed on the bonding opposite face. It is seen from comparison with FIG. 4B that, at the same compressive stress and the same film thickness, the convexity amount of the substrate 2 is larger when the inorganic film 6 with tensile stress is formed on the bonding opposite face. In the case in which the inorganic film 6 with compressive stress is formed on the bonding opposite face, if a difference between a product of the stress in the inorganic film 4 on the bonding face side and the film thickness and a product of the stress in the inorganic film 6 on the bonding opposite face side and the film thickness is negative, the bonding face is convex. One way to adjust the compressive stress in an inorganic film is to adjust the pressure during film formation. For example, in a plasma CVD film-forming method, $SiH_4$ and $CH_4$ are used with a 13.56 MHz RF power supply HF (100 W) for the shower head and a 380 kHz RF power supply LF (200 W) for the platen, and the pressure is adjusted to 100 Pa for triode film-forming. As a result, an SiC film with a compressive stress of −500 MPa is formed. If the pressure is adjusted to 50 Pa for triode film-forming, an SiC film with a compressive stress of −650 MP is formed.

Figure 6A:
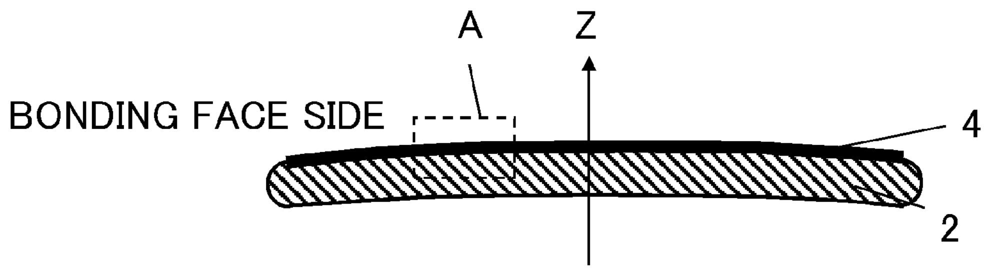
FIGS. 6A to 6C are views schematically showing a case in which a bonding face of a substrate according to the example has recesses and through-holes.
Figure 6B:
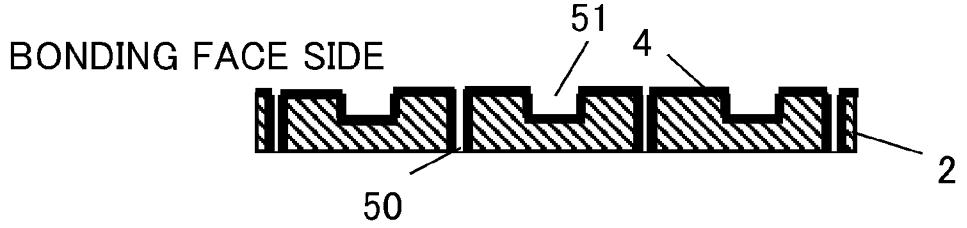
Figure 6C:
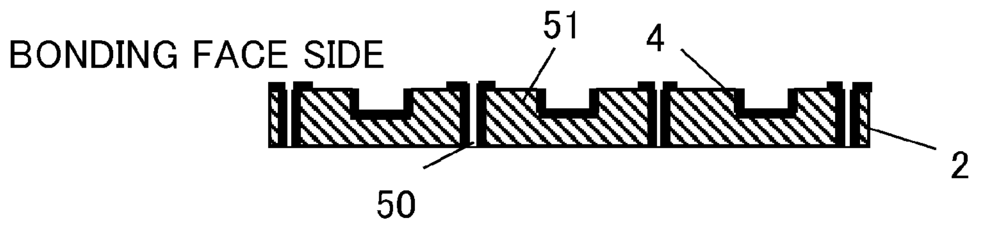

FIGS. 4B and 4C show the convexity amount of an unprocessed substrate, but the convexity amount of the bonding face increases when a process is performed to form a recess 51 on the bonding face of the substrate 2 as shown in FIG. 6B. FIG. 6B is an enlarged view of the portion enclosed by the frame line A in FIG. 6A. The larger the area (which is referred to as an opening area) of the region in which the recess 51 is formed, the more the convexity amount of the bonding face increases. It is also possible to perform a process to form a through-hole 50 that penetrates to the bonding opposite face. If the depth of the recess 51 is at least ⅙ of the substrate thickness, the convexity amount increases. Although FIGS. 4A to 4C, 5A, 5B, 6A, and 6B show an example in which an inorganic film is formed on the entire bonding face, it is also possible that the inorganic film 4 is patterned on part of the bonding face as shown in FIG. 6C. In the case in which recesses and through-holes are formed on both the bonding face and the bonding opposite face of the substrate, if an opening rate (a first opening rate) of the bonding face is larger than an opening rate (a second opening rate) of the bonding opposite face, the bonding face is likely to be convex. The opening rate is a proportion of the area of an opening generated by the recess or the through-hole to the area of the bonding face. In the case in which recesses and through-holes are formed on the bonding face of the first substrate, it is preferable that an inorganic film is formed on portions of the bonding face of the first substrate that face the second substrate, and on walls of the recesses or the through-holes.

Figure 7A:
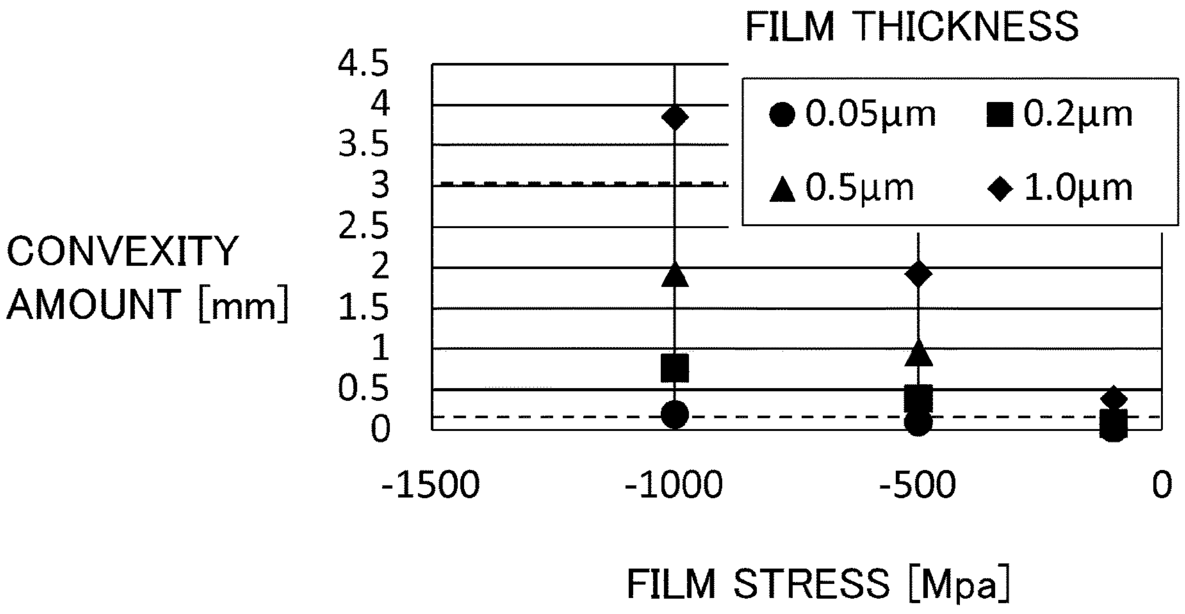
FIG. 7A is a graph showing a relationship between the film stress in an inorganic film, the film thickness, the substrate convexity amount according to the example.
Figure 7B:
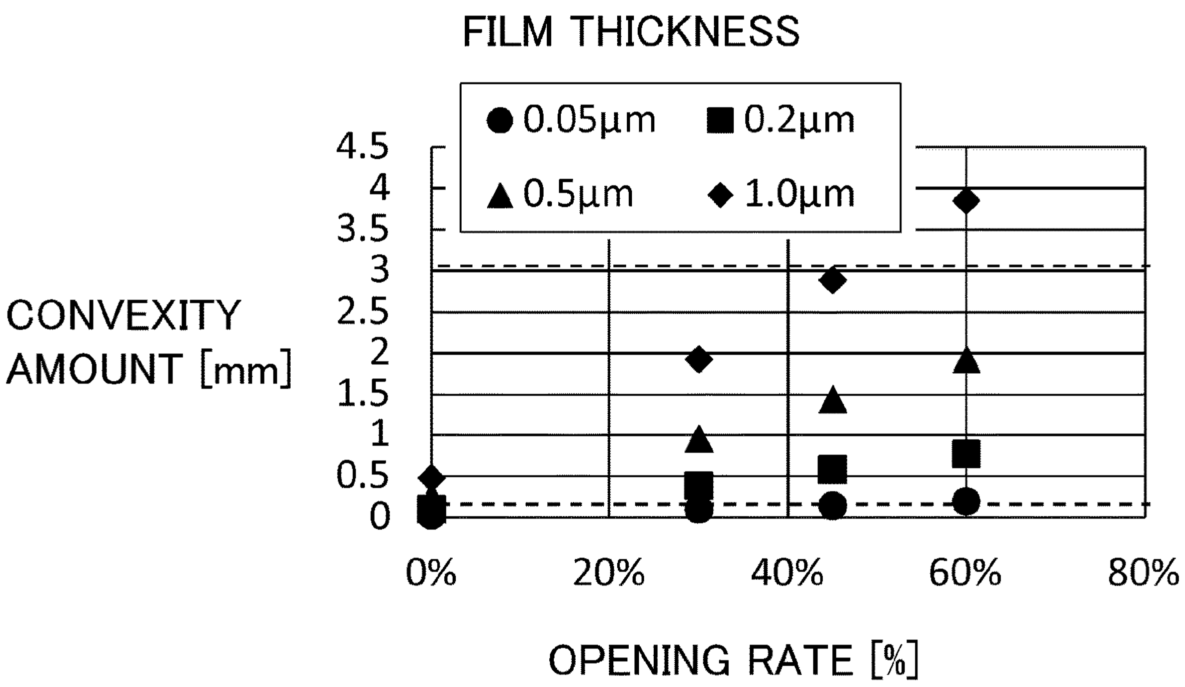
FIG. 7B is a graph showing a relationship between the film thickness, the substrate convexity amount, and the opening rate according to the example.

FIG. 7A shows a relationship between the convexity amount of the substrate 2 with an opening rate of 30% and the film stress and the film thickness of the inorganic film 4. Under the same conditions for the film stress and the film thickness of the inorganic film, the convexity amount of the substrate with an opening rate of 30% increased by about 4 times compared with that of a substrate with an opening rate of 0% (recesses and through-holes are not formed). FIG. 7B shows a relationship between the opening rate and the film thickness of the inorganic film, and the convexity amount. FIG. 7B shows the convexity amounts of a film forming face of a substrate when an inorganic film with a constant film stress is formed so as to have various film thicknesses on the substrate processed such that the bonding face have various opening rates. As shown in FIG. 7B, the convexity amount of the bonding face when an inorganic film with a film stress of −500 MPa and a film thickness of 0.05 μm was formed on the bonding face of the substrate with an opening rate of 30% was about 0.1 mm, and it was found that the larger the opening rate, the larger the convexity amount.

If the convexity amount of the bonding face of the substrate is too large, cracks may occur depending on the rigidity of the substrate. For substrates with processed bonding faces, the convexity amount is preferably not more than 3 mm. If an inorganic film with a film stress of −1000 MPa and a film thickness of 1.0 μm is formed on the bonding face, the convexity amount exceeds 3 mm and cracks may occur on the substrate.

Figure 8:
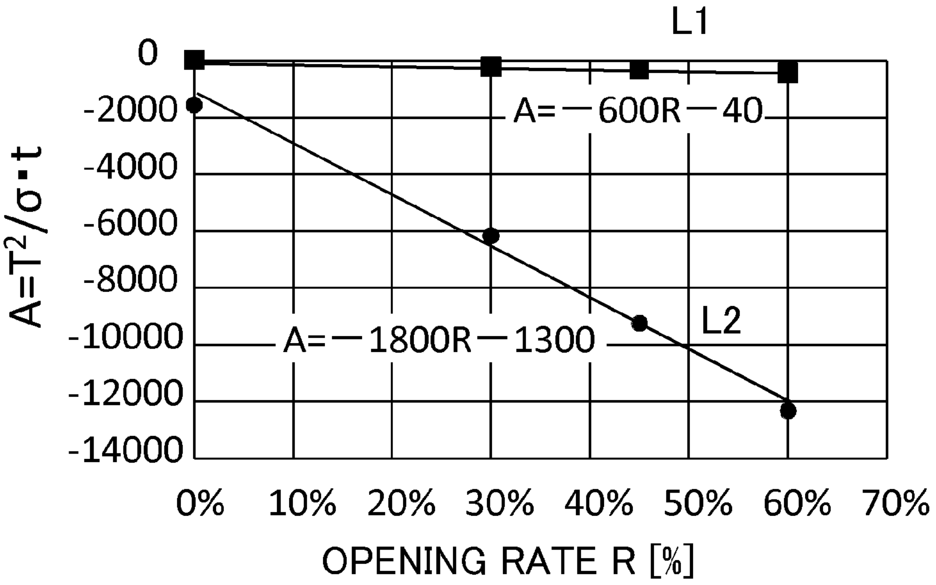
FIG. 8 is a graph showing a relationship between the opening rate, the feature value A, and the convexity amount according to the example.

FIG. 8 shows a relationship between a substrate thickness T [μm], a film stress σ [MPa] in an inorganic film, a film thickness t [μm] of the inorganic film, an opening rate R [%] of a bonding face, and a convexity amount B [mm]. In FIG. 8, the horizontal axis indicates the opening rate R, and the vertical axis indicates the feature value $A=T^2/\sigma \times t$. FIG. 8 is a plotting result of the relationship between the feature value A and the opening rate R, based on the relationship between the film stress a, the film thickness t, and the convexity amount B shown in FIG. 4B, the relationship between the substrate thickness T, the film thickness t, and the convexity amount B shown in FIG. 4C, and the relationship between the opening rate R, the film thickness t, and the convexity amount B shown in FIG. 7B. If the opening rate R is constant, the larger the convexity amount B, the smaller the feature value A. In FIG. 8, a graph L1 ($A=-600\times R-40$) shows a relationship between the feature value A and the opening rate R in a case in which the convexity amount B=0.1 mm, and a graph L2 ($A=-1800\times R-1300$) shows a relationship between the feature value A and the opening rate R in a case in which the B=3 mm. The suitable range of convexity amount is 0.1 to 3 mm. The film stress σ and the film thickness t of an inorganic film to be formed are set from the feature value A between the graphs L1 and L2 such that $-1800\times R-1300 \leq A \leq -600\times R-40$, according to the opening rate R of the bonding face and the substrate thickness T of the substrate. If an inorganic film is formed on the bonding face according to these settings, the bonding surface of the substrate can be made convex while suppressing the occurrence of cracks.

FIGS. 10A to 10H are views showing a method for manufacturing a liquid ejection substrate for a liquid ejection head according to the example.

Figure 10A:
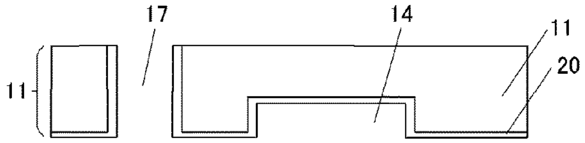
FIGS. 10A to 10H are views showing a method for manufacturing a liquid ejection substrate according to the example.

FIG. 10A shows the channel substrate 11. The channel substrate 11 is constituted by a silicon substrate, for example, and is formed by exposing and developing a positive resist and then performing Si dry etching to form a through-hole portion that will be ultimately the channel 17 and the recess 14. Then, the inorganic film 20 is formed on the bonding face of the channel substrate 11. The inorganic film 20 is an SiC film with a film stress of −500 MPa (compressive stress) and a film thickness of 0.15 μm, and is formed using the CVD method, for example. The compressive stress acting in the inorganic film 20 makes the bonding face of the channel substrate 11 convex (convex downward in FIG. 10A). The recess 14 formed on the bonding face makes the bonding face likely to be convex.

Figure 10B:
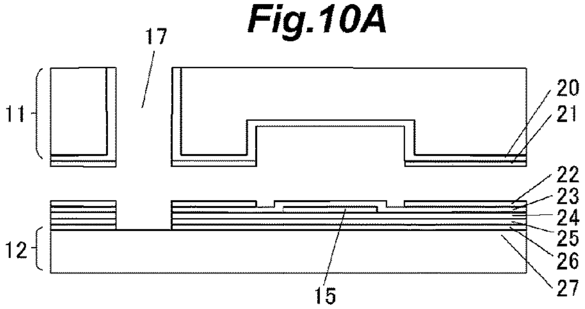

Then, the actuator substrate 12 shown in FIG. 10B is prepared. The actuator substrate 12 is an SOI substrate constituted by active layers 24 and 26 and BOX layers 25 and 27, and is processed to have a layer that will become the vibrating film 16. The piezoelectric element 15 is disposed on the vibrating film 16. The piezoelectric element 15 includes a bottom electrode formed on the vibrating film 16, the piezoelectric element 15 formed on the bottom electrode, and a top electrode formed on the piezoelectric element 15. A protective film 23 is disposed so as to cover the layers of the piezoelectric element 15 and the top electrode.

The piezoelectric element 15 is made of sintered metal oxide crystals, and may be a PZT (lead titanate zirconate) film, for example. When a drive voltage is applied from a drive IC (not shown) to the piezoelectric element 15, the piezoelectric element 15 is deformed by the reverse piezoelectric effect. Thus, the vibrating film 16 is deformed together with the piezoelectric element 15, thereby causing a volume change in the foaming chamber 18 and pressurizing the liquid, which is ejected as micro-droplets from the ejection port 19.

The inorganic film 22 is formed on the bonding face of the actuator substrate 12 facing the channel substrate 11. The configuration of the inorganic film 22 is the same as that of the inorganic film 20. As a result, the bonding face of the actuator substrate 12 facing the channel substrate 11 has a convex shape toward the channel substrate 11.

Figure 10C:
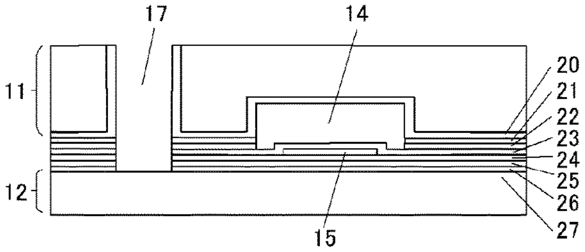

Next, as shown in FIG. 10C, the channel substrate 11 and the actuator substrate 12 are bonded together via the adhesive layer 21. The bonding is performed through heating at a temperature corresponding to the softening temperature of the adhesive (e.g., 150° C.). The thickness of the adhesive layer is set to 1 to 51 μm. At this time, the bonding face of the channel substrate 11 and the bonding face of the actuator substrate 12 are convex in the direction facing each other, and the contact starts from at a single point near the center of the substrates and the contact region spreads outward from the center. Therefore, air bubbles between the bonding faces are likely to be discharged to the outside, and voids are unlikely to be generated in the bonding region.

Figure 10D:
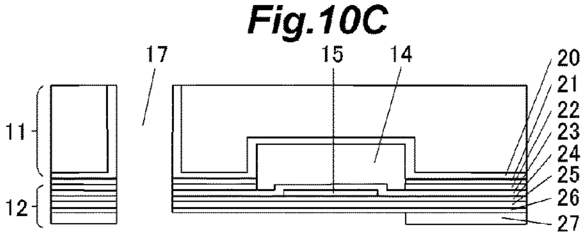

Next, as shown in FIG. 10D, the second bonding face of the actuator substrate 12, which is opposite to the bonding face with the channel substrate 11, is thinned by grinding and polishing to form a recess that will become the foaming chamber 18 after bonding. As a result, the opening rate of the second bonding face of the actuator substrate 12 becomes 30%, for example.

Figure 10E:
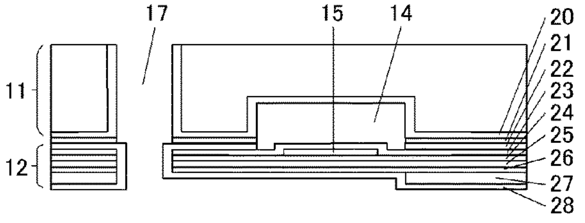

Next, as shown in FIG. 10E, the inorganic film 28 is formed on the second bonding face of the actuator substrate 12. The configuration of the inorganic film 28 is the same as that of the inorganic films 20 and 22, that is, the inorganic film is an SiC film with a film stress of −500 MPa (compressive stress) and a film thickness of 0.15 μm, and is formed using the CVD method. The compressive stress acting in the inorganic film 28 makes the second bonding face of the actuator substrate 12 convex downward in FIG. 10E.

Figure 10F:
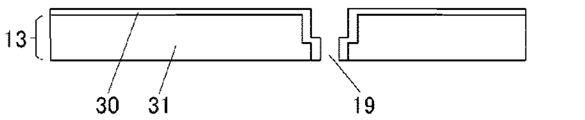

Next, as shown in FIG. 10F, the inorganic film 30 is formed on the bonding face of the nozzle substrate 13 in which a through-hole that will become the ejection port 19 after bonding is formed through a silicon substrate 31. The opening rate of the bonding face of the nozzle substrate 13 is set to 30%. The configuration of the inorganic film 30 is the same as that of the inorganic films 20, 22, and 28, that is, the inorganic film is an SiC film with a film stress of −500 MPa (compressive stress) and a film thickness of 0.15 μm, and is formed using the CVD method. The compressive stress acting in the inorganic film 30 makes the bonding face of the nozzle substrate 13 convex upward in FIG. 10F.

Figure 10G:
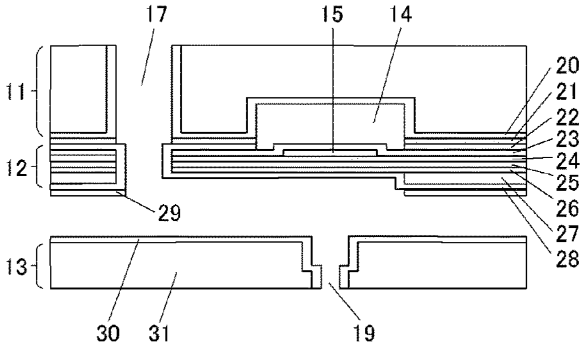

Next, as shown in FIG. 10G, the second bonding face of the actuator substrate 12 and the bonding face of the nozzle substrate 13 are set facing each other.

Figure 10H:
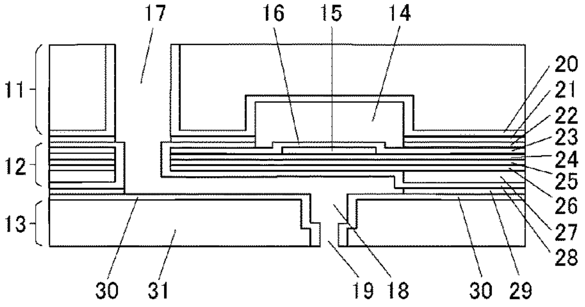

Next, as shown in FIG. 10H, the second bonding face of the actuator substrate 12 and the bonding face of the nozzle substrate 13 are bonded together via the adhesive layer 29. The bonding is performed through heating at a temperature that is determined by the material of the adhesive (e.g., 150° C.). The thickness of the adhesive layer is set to 1 to 51 μm. At this time, the second bonding face of the actuator substrate 12 and the bonding face of the nozzle substrate 13 are convex in the direction facing each other, and the contact starts from at a single point near the center of the substrates and the contact region spreads outward from the center. Therefore, air bubbles between the bonding faces are likely to be discharged to the outside, and voids are unlikely to be generated in the bonding region.

In the liquid ejection substrate for a liquid ejection head manufactured through the above-described processes, the generation of voids in a bonding region between substrates is more reliably suppressed. In particular, in the case of a liquid ejection head including a piezoelectric element, the ink channel is close to a space in which the piezoelectric element is sealed. In the liquid ejection head having the liquid ejection substrate manufactured according to the manufacturing method of this example, the generation of voids in a bonding region between substrates can be suppressed, and thus the occurrence of ink leakage, ink contamination of the piezoelectric elements, color mixing, and the like can be suppressed.

According to the present disclosure, it is possible to provide methods for manufacturing a substrate bonded body and a liquid ejection substrate, in which generation of voids in a bonding region between substrates can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-129394, filed on Aug. 15, 2022, which is hereby incorporated by reference herein in its entirety.

What is claimed is:

1. A method for manufacturing a substrate bonded body in which a first substrate and a second substrate are bonded together, the first substrate forming a first portion of an element, and the second substrate forming a second portion of the element, comprising:

a film-forming step of forming an inorganic film on a bonding face of the first substrate, the bonding face facing the second substrate, such that the bonding face has a convex shape toward the second substrate;

a contact step of bringing the first substrate and the second substrate closer and into contact with each other; and a bonding step of bonding the first substrate and the second substrate by an adhesive, wherein, in the film-forming step, the inorganic film is formed so as to have a convexity amount of 0.1 to 3 mm, the convexity amount being a distance between an apex of the convex shape of the bonding face of the first substrate and the bonding face of the first substrate in a flat state.

2. The method for manufacturing the substrate bonded body according to claim 1, wherein, in the film-forming step, the inorganic film is formed such that the convex bonding face of the first substrate has a bowl-shaped face that is convex along a radial direction from a circumferential edge of the bonding face to a center of the bonding face.

3. A method for manufacturing a substrate bonded body in which a first substrate and a second substrate are bonded together, the first substrate forming a first portion of an element, and the second substrate forming a second portion of the element, comprising:

a film-forming step of forming an inorganic film on a bonding face of the first substrate, the bonding face facing the second substrate, such that the bonding face has a convex shape toward the second substrate;

a contact step of bringing the first substrate and the second substrate closer and into contact with each other; and a bonding step of bonding the first substrate and the second substrate by an adhesive, wherein, in the film-forming step, the inorganic film is formed such that the convex bonding face of the first substrate has a saddle-shaped face that is convex along a direction that is perpendicular to a specific straight line extending through a center of the bonding face, from a circumferential edge of the bonding face to the straight line.

4. The method for manufacturing the substrate bonded body according to claim 1, wherein, in the film-forming step, the inorganic film is formed such that compressive stress is generated in the inorganic film.

5. The method for manufacturing the substrate bonded body according to claim 1, wherein, in the film-forming step, the inorganic film is formed so as to contain any one of SiC, SiN, SiO, TiO, $Ta_2O_5$, $HfO_2$, $ZrO_2$, and $Al_2O_3$.

6. The method for manufacturing the substrate bonded body according to claim 1, wherein, in the film-forming step, the inorganic film is formed through sputtering, CVD, or evaporation.

7. The method for manufacturing the substrate bonded body according to claim 1, wherein, in the film-forming step, the inorganic film is formed on the entire bonding face of the first substrate.

8. The method for manufacturing the substrate bonded body according to claim 1, wherein, in the film-forming step, the inorganic film is formed on part of the bonding face of the first substrate.

9. The method for manufacturing the substrate bonded body according to claim 1, wherein, in the bonding step, the bonding is performed such that the adhesive layer has a thickness of 1 to 5 μm.

10. The method for manufacturing the substrate bonded body according to claim 1, wherein the film-forming step includes forming an inorganic film on a bonding opposite face, which is a face opposite to the bonding face of the first substrate, and wherein, in the film-forming step, inorganic films are formed on the bonding face and the bonding opposite face of the first substrate such that a difference between a product of stress generated in the inorganic film formed on the bonding face of the first substrate and a film thickness and a product of stress generated in the inorganic film formed on the bonding opposite face and a film thickness is negative.

11. The method for manufacturing the substrate bonded body according to claim 10, wherein, in the film-forming step, the inorganic film is formed on the bonding opposite face of the first substrate such that tensile stress is generated in the inorganic film formed on the bonding opposite face.

12. The method for manufacturing the substrate bonded body according to claim 1, further including a forming step of forming a recess or a through-hole on the bonding face of the first substrate.

13. The method for manufacturing the substrate bonded body according to claim 12, wherein the film-forming step includes forming an inorganic film on a wall of the recess or the through-hole.

14. The method for manufacturing the substrate bonded body according to claim 12, wherein, in the forming step, the recess with a depth of at least ⅙ of a thickness of the first substrate is formed.

15. The method for manufacturing a substrate bonded body according to claim 12, wherein, in the film-forming step, the inorganic film is formed on the bonding face of the first substrate such that $-1800\times R-1300 \le A \le -600\times R-40$, where A is a feature value defined as $T^2/(\sigma\times t)$, T is a thickness of the first substrate, σ is stress generated in the inorganic film on the bonding face of the first substrate, t is a thickness of the inorganic film on the bonding face of the first substrate, and R is an opening rate defined as a proportion of an area of an opening generated by the recess or the through-hole to an area of the bonding face of the first substrate.

16. The method for manufacturing the substrate bonded body according to claim 13, wherein the forming step includes forming a recess or a through-hole on a bonding opposite face, which is a face opposite to the bonding face of the first substrate, and wherein a first opening rate defined as a proportion of an area of an opening generated by the recess or the through-hole formed on the bonding face of the first substrate to an area of the bonding face on which the recess or the through-hole is formed is larger than a second opening rate defined as a proportion of an area of an opening generated by the recess or the through-hole formed on the bonding opposite face to an area of the bonding opposite face on which the recess or the through-hole is formed.

17. The method for manufacturing the substrate bonded body according to claim 1, wherein the film-forming step includes forming an inorganic film on a bonding face of the second substrate such that the bonding face of the second substrate has a convex shape toward the bonding face of the first substrate.

18. The method for manufacturing the substrate bonded body according to claim 1, wherein the first substrate and the second substrate are each a wafer-shaped substrate on which a plurality of elements are formed.

19. A method for manufacturing a liquid ejection substrate in which a first substrate and a second substrate are bonded together, the first substrate having an ejection port that ejects liquid and a first channel that is in communication with the ejection port and supplies the liquid, and the second substrate having a second channel that is connected to the first channel to form a channel, comprising:

a film-forming step of forming an inorganic film on a bonding face of the first substrate, the bonding face facing the second substrate, such that the bonding face has a convex shape toward the second substrate;

a contact step of bringing the first substrate and the second substrate closer and into contact with each other; and a bonding step of bonding the first substrate and the second substrate by an adhesive, wherein, in the film-forming step, the inorganic film is formed so as to have a convexity amount of 0.1 to 3 mm, the convexity amount being a distance between an apex of the convex shape of the bonding face of the first substrate and the bonding face of the first substrate in a flat state.

* * * * *